Nov. 28, 1944. H. VAN DER SCHALIE 2,363,627
FILM DEVICE
Filed Aug. 23, 1941
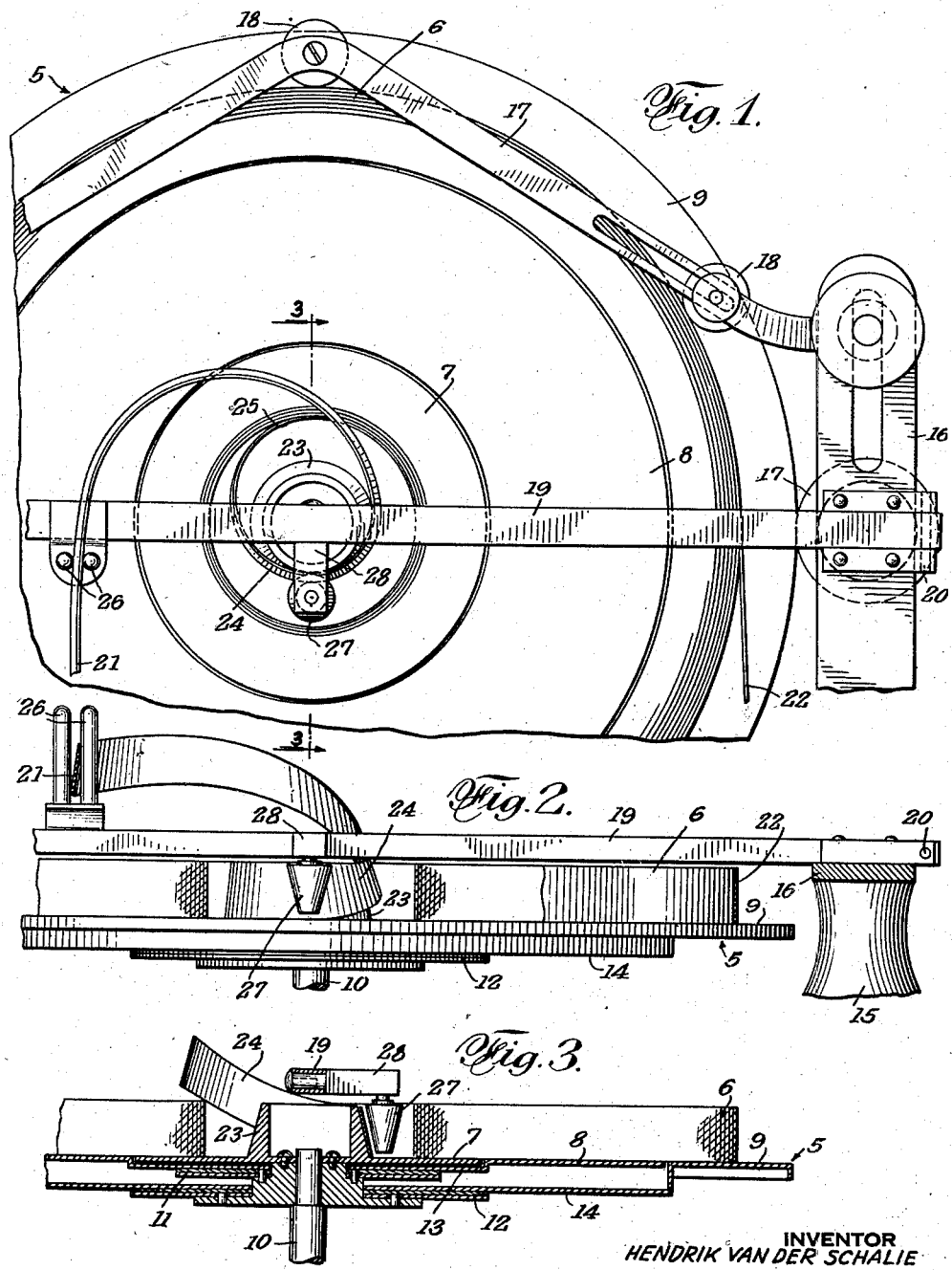
INVENTOR
HENDRIK VAN DER SCHALIE
BY
ATTORNEYS.

Patented Nov. 28, 1944

2,363,627

UNITED STATES PATENT OFFICE 2,363,627

FILM DEVICE

Hendrik Van der Schalie, Ridgewood, N. J.

Application August 23, 1941, Serial No. 408,029

3 Claims. (Cl. 88—18.7)

This invention relates to a film device in which a roll of film is arranged upon a support and the film fed out from the center and rewound upon the outer portion of the roll of film. The present invention relates more particularly to improved means for controlling the film as it is being drawn or fed from the core of the film roll, and is an improvement on the device disclosed in my Patent No. 2,177,505, dated October 24, 1939.

As disclosed in my patent, a plurality of concentrically arranged turntable discs are provided as the support for the film roll, the innermost turntable disc being positively driven and the one or more turntable outer discs being frictionally driven at lesser speeds as determined by the weight of the portions of the film roll carried thereby, by the frictional resistance of friction members employed in the device, and by the weight drag imparted by portions connected to the turntable discs and frictionally engaged with the friction members.

By means of this type of drive the turns or convolutions of the film roll are in more or less continual motion, the larger outer layers being fed toward the core of the film roll and becoming correspondingly smaller as they approach the core. Should this transition from larger to smaller layers be sluggish, thus causing a too great concentration of the film roll layers upon the outer turntable discs and resulting in a corresponding slowing of the rotation of the outer turntable discs, the film feed would not be impaired, because the run of film from the core of the roll would merely become tautened to cause a speeding up of the transition from the larger to the smaller layers and a corresponding speeding up of the outer turntable discs resulting in a proper distribution of the layers of the film roll.

Should, however, the transition from larger to smaller layers be too rapid, thus causing an overconcentration of the film roll layers at the core of the roll and a corresponding speeding up of the rotation of the outer turntable discs, the run of the film from the core would be greater than necessary and an excessive loop of film would be formed between the core of the film roll and the take-up sprocket of the projector or like machine through which the film is fed. This excessive loop would grow until such time as the turntable disc could become readjusted in the speed relationship to reabsorb this excess film into the film roll. In practice, however, it has been found that this excess loop often becomes progressively worse and that the excess film loop grows to such a degree as to snarl and snag the mechanism of the device.

It is, therefore, a primary object of this invention to provide means in a device of the indicated type for controlling the feed of film from a film roll and preventing excessive feed.

Other objects will be hereinafter pointed out or will become apparent from the following specification descriptive of a preferred embodiment of the invention illustrated in the accompanying drawing.

In the drawing—

Fig. 1 is a plan view, partly broken, of a film device illustrating features of the invention;

Fig. 2 is a side elevational view thereof, parts being broken away and in cross section; and Fig. 3 is a cross sectional view as taken substantially on the line 3—3 of Fig. 1.

The improved device herein disclosed comprises a turntable generally designated 5, supporting a roll of film 6. The turntable may comprise a plurality of discs 7—8—9 in flush concentric arrangement. The initial drive of the turntable may comprise the shaft 10, which also may support said turntable. The arrangement is such that the innermost disc 7 is positively driven by the shaft 10, whereas the discs 8 and 9 are frictionally driven, as by means of friction members 11 and 12, having engagement with bridging members 13 and 14 of said turntable discs 8 and 9, respectively.

The device is also provided with means, such as a column 15, supporting a bridge member 16, which carries adjustable guide arms 17 (only one of which is illustrated). The guide arms carry film roll guides, such as rollers 18, arranged to engage the outer periphery of the film roll 6 to control its position upon the turntable 5. A hold-down member, such as the bar 19, may also be provided, said member being pivotally supported at 20 on the column 15. This hold-down member serves to obviate rising up of the film layers from the turntable. It should be understood that the film is endless and the respective inner and outer runs 21 and 22 of the film roll are trained over sprockets or other take-up devices, which may be substantially as shown in Fig. 2 of my Patent No. 2,177,505.

The foregoing is substantially in accordance with the disclosure of my aforesaid patent and forms the basis for the improvements of the present invention.

As previously stated herein control of the run of film from the core of the film roll is desired. The innermost disc 7 is preferably provided with a core member 23, which is preferably conical. The film run 21 is so trained as to form preferably a complete loop 24, which extends from the core of the film roll at 25 to suitable guide means 26, which may be mounted upon the hold-down member 19. This loop 24, after leaving contact with the cone-shaped core member 23, rises upwardly in both spiral and helical form to pass above the plane of the film roll, as best seen in Figs. 2 and 3.

It will be apparent that so long as the rate of feed of the loop 24, as imparted by the rotation of the disc 7 and the core member 23, is not in excess of the take-up speed of the run 21, the loop 24 cannot grow but may become smaller. Should this relative rate change to cause an excess feed of the loop 24 over that of the run 21, the loop would enlarge and leave contact with the coned core member 23. Ordinarily this loop would grow until it might interfere with other portions of the device. Means are therefore provided to obviate the growth of the loop 24 and, in the present instance, comprises a regulating or braking means, which may be a free running conical roller 27, carried by the member 19 and so placed with respect to the core member 23 as to be closely adjacent to the film in contact with said core member.

Now if the loop 24 seeks to grow unduly it will leave the core member 23 and engage the roller 27, which exerts a drag or braking force upon said loop and tends to hold the loop in the core of the film roll. The reactive force thus imparted to the film being fed causes a redistribution of the layers or convolutions of said film roll and, therefore, a correction of the excess feed. Thereupon the loop 24 again engages the core member 23 and normal film feed is resumed.

In the present form of the device the roller 27 is carried upon a projection 28 of the member 19. The roller may also be carried directly by said member 19. In the latter instance it is preferred to so position the guide 26 as to provide approximately 270° of loop between said roller and said guide. For example, mounting the roller to the left of the core member 23 and upon the hold-down member 19 would necessitate moving the guide 26 to a point along a line passing between the centers of said core member and the present position of the roller 27. It is preferred to maintain the above relative positions of the guide and roller to allow a free and easy feed and allow for the easy rise of the film loop from the film core to the guide 26, which is positioned above both the film roll and the hold-down member 19.

While the invention has been disclosed in detail with respect to the preferred form illustrated, it should be understood that variations within the scope of the invention may well be made by those skilled in the instant art.

I claim:

1. In a device of the character indicated, a horizontal rotatable turntable having an upstanding central core member, means for rotating said core member and turntable whereby a roll of film supported on edge on said turntable will be fed out from the core thereof and wound up on the outside thereof, a drag member closely spaced from said core member and forming with said core member a narrow passage for the single inner layer of the core of a film, guide means for forming an external film loop above the film roll, the core of the film being spaced from the core member, and said single inner film layer being normally fed by frictional contact with said core member from the film roll to said guide means and projector, whereby when said loop enlarges said inner layer of film from the core will tend to leave contact with said upstanding rotating core member and frictionally engage said drag member to frictionally hold back said inner film layer until said external loop is reduced and said inner film layer again makes contact with said upstanding core member.

2. In a device of the character indicated, a horizontal rotatable turntable having an upstanding central core member, means for rotating said turntable and core member whereby a roll of film supported edgewise on said turntable will be fed by said turntable and core member from the core of said film, a drag member spaced from said upstanding core member to form with said core member a film passage for the single inner layer of film being fed from the film core, guide means above the roll of film and positioned in relation to said film passage so as to form an external film loop embracing substantially more than 180° about said core member, the core of the film being spaced from the core member, and said single inner film layer being normally fed by frictional contact with said core member from the film roll to said guide means and projector, whereby upon enlargement of said film loop the inner film layer will tend to leave contact with said upstanding core member and frictionally engage and be retarded by said drag member until said loop is reduced to normal size.

3. In a device of the character indicated, a frame, a horizontal turntable rotatably mounted thereon and having an upstanding central core member, means for rotating said turntable and core member whereby a roll of film supported edgewise on said turntable will be fed by said turntable and core member from the core of said film, an arm member carried by said frame and extending over the film on said turntable, a drag member carried by said arm and extending down along said upstanding core member and slightly spaced therefrom to form with said core member a film passage for the single inner layer of film being fed from the film core, film guide means carried by said arm and located above said film roll and generally in the line of said film passage, the core of the film being spaced from the core member, and said single inner film layer being normally fed by frictional contact with said core member from the film roll to said guide means and projector, whereby the film layer passing from the core of the film through said film passage and past said guide means will form an external film loop of substantially more than 180° about said core member, for the purpose described.

HENDRIK VAN DER SCHALIE.